(12) United States Patent
Riess

(10) Patent No.: US 10,244,149 B2
(45) Date of Patent: Mar. 26, 2019

(54) IMAGING SYSTEM WITH SCAN LINE TITLED OFF FOCAL PLANE

(71) Applicant: LOCKHEED MARTIN CORPORATION, Bethesda, MD (US)

(72) Inventor: Michael Riess, South Glens Falls, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 235 days.

(21) Appl. No.: 14/734,639

(22) Filed: Jun. 9, 2015

(65) Prior Publication Data

US 2016/0366310 A1    Dec. 15, 2016

(51) Int. Cl.
*H04N 5/225* (2006.01)
*G02B 26/12* (2006.01)
*H04N 1/00* (2006.01)

(52) U.S. Cl.
CPC ........... *H04N 5/225* (2013.01); *G02B 26/125* (2013.01); *H04N 1/00827* (2013.01)

(58) Field of Classification Search
None
See application file for complete search history.

(56) References Cited

U.S. PATENT DOCUMENTS

| | | | | |
|---|---|---|---|---|
| 4,090,775 A * | 5/1978 | Lobb | ...................... | G02B 13/10 359/433 |
| 4,319,270 A * | 3/1982 | Kimura | .................. | G01N 25/72 250/559.46 |
| 5,136,157 A * | 8/1992 | Apter | ...................... | G01N 21/90 250/223 B |
| 5,635,699 A | 6/1997 | Cherry et al. | | |
| 6,012,816 A * | 1/2000 | Beiser | ................ | G02B 27/0025 353/10 |
| 6,484,066 B1 * | 11/2002 | Riess | ...................... | G01B 11/00 198/502.2 |
| 7,156,311 B2 * | 1/2007 | Attia | .................. | G06F 17/30879 235/462.08 |
| 8,462,206 B1 | 6/2013 | McGuire et al. | | |
| 2004/0001152 A1 * | 1/2004 | Funamoto | .............. | H04N 5/217 348/222.1 |

(Continued)

FOREIGN PATENT DOCUMENTS

| EP | 0663643 | 6/2000 |
|---|---|---|
| EP | 2413095 | 2/2012 |

(Continued)

OTHER PUBLICATIONS

Search Report dated Dec. 16, 2016 in related of AU Application No. 2016202961, 7 pages.

(Continued)

*Primary Examiner* — Edemio Navas, Jr.
(74) *Attorney, Agent, or Firm* — Kent Kemeny; Andrew M. Calderon; Roberts Mlotkowski Safran Cole & Calderon, P.C.

(57) ABSTRACT

Image scanning systems which scan images of objects as they are transported along a conveying system and methods of such scanning are provided. The optical system includes a conveying system, and optical elements positioned at least one of above, below and to a side of the conveying system such that a scan line is tilted with respect to an imaging surface of the conveyed object.

17 Claims, 5 Drawing Sheets

(56) References Cited

U.S. PATENT DOCUMENTS

| | | | | |
|---|---|---|---|---|
| 2005/0189329 | A1* | 9/2005 | Talwar | B23K 26/0604 219/121.65 |
| 2011/0155808 | A1* | 6/2011 | Santos | G06K 7/146 235/462.15 |
| 2011/0248083 | A1* | 10/2011 | Bonner | G06F 17/30 235/375 |
| 2013/0020391 | A1* | 1/2013 | Olmstead | G06K 7/10722 235/438 |
| 2014/0231638 | A1 | 8/2014 | Damaskinos et al. | |
| 2015/0310242 | A1* | 10/2015 | Wehrle | G06K 7/10732 235/470 |
| 2016/0366310 | A1 | 12/2016 | Riess | |

FOREIGN PATENT DOCUMENTS

| | | |
|---|---|---|
| EP | 3104591 | 12/2016 |
| JP | 292168 | 3/1990 |
| JP | 09-037031 | 2/1997 |
| WO | 20070136616 | 11/2007 |
| WO | 20080107892 | 12/2008 |
| WO | 2011113044 | 9/2011 |

OTHER PUBLICATIONS

Chanbai et al., "Confocal Line Scanning Sensor", iopscience.iop.org, Journal of Physics: Conference Series 311 (2011), 6 pp.

European Search Report dated Jan. 9, 2017 in related of EP Application No. 16170332, 8 pages.

Office Action dated Jun. 9, 2017 in related CA Application No. 2,931,065, 4 pages.

Notification of Reasons for Rejection dated Aug. 1, 2017 in related JP Application No. 2016-112579, 5 pages.

Decision of Rejection dated Jan. 16, 2018 in related JP Application No. 2016-112579, 13 pages.

Office Action dated Feb. 2, 2018 in related EP Application No. 16 170 332.7-1208, 4 pages.

Office Action dated May 8, 2018 in related Canadian Application No. 2,931,065, 5 pages.

* cited by examiner

IMAGING SYSTEM WITH SCAN LINE TITLED OFF FOCAL PLANE

FIELD OF THE INVENTION

The invention is directed to image scanning systems and, more particularly, to optical scanning systems which scan images of objects as they are transported along a conveying system and methods of such scanning.

BACKGROUND DESCRIPTION

Line scan imaging of objects transported on a conveying system typically requires that the optical components, e.g., sensing element of a camera, be parallel to the surface of the object that is being scanned. In conveyor applications, this forces the optical components to be mounted directly below the equipment, for bottom scanned images. However, the environment below the conveying system is full of airborne debris that is difficult to manage, which coats the camera optics and mirror. To this end, bottom scan applications require frequent cleaning, which over time degrades the mirrors and optical elements and hence eventually degrades the quality of the images acquired by the system.

To account for the airborne debris, previous efforts have focused on reducing the airborne debris. This includes shielding panels to protect the optical components. However, shielding panels are difficult to install, are costly and obstruct many of the components for maintenance. Another solution is to use transparent plates as viewing ports. These plates, though, become loaded with debris, typically get scratched and become hazy, and add cost. Another approach is to use vacuum or air knife systems. These systems require additional power, controls and maintenance, in addition to adding costs and contributing to noise within the facility.

Top scan applications, on the other hand, require the optical elements, e.g., sensing element of the camera, to be placed directly over the conveying system. Maintenance and adjustments are difficult to perform particularly while the objects are moving on the conveying system. In fact, with top scan applications, maintenance requires the conveying system to be stopped, or provide some means of safe access while the conveying system is running. There is also the issue of glare reduction, which can be reduced by angling the "scan line plane". Such angling of the scan line plane, though, requires additional conveyor length for top scan applications; whereas, for bottom scanning applications, the angle reduces the effective viewing slot for light to pass through such that a wider gap between adjacent belts or other conveyances may be needed.

SUMMARY OF THE INVENTION

In an aspect of the invention, an optical system comprises a conveying system, and optical elements positioned at least one of above, below and to a side of the conveying system such that a scan line is tilted with respect to an imaging surface of the conveyed objects.

In yet another aspect of the invention, an optical system comprises: a conveying system comprising multiple conveyances with gaps between adjacent conveyances of the multiple conveyances; and a camera and mirror combination which projects a scan plane through one of the gaps such that the scan line is tilted with respect to an imaging surface of the conveyed objects.

In still yet another aspect of the invention, a method of scanning objects on a conveying system comprises projecting a scan line at a tilted angle at the object while it is being transported along the conveying system.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

Figure 1A:
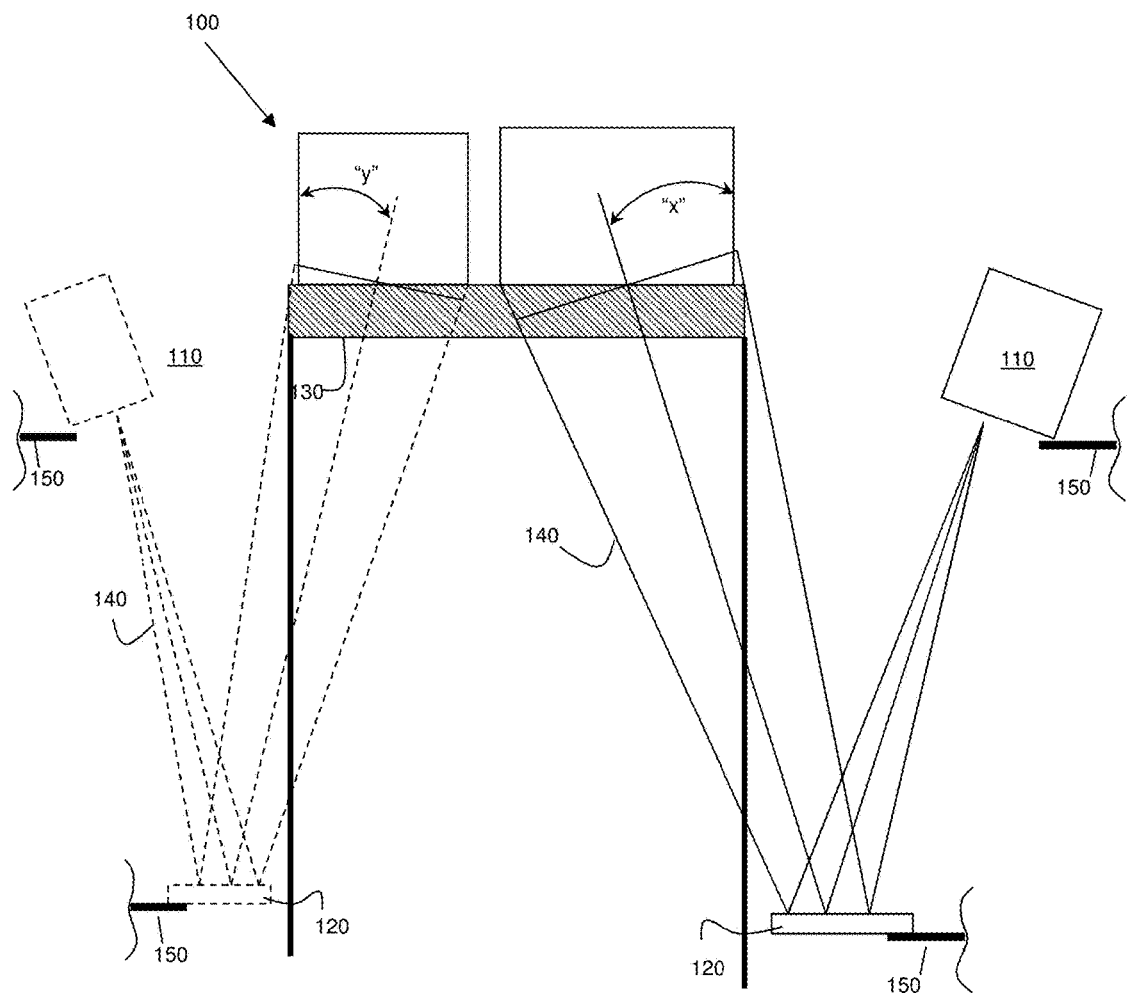
FIGS. 1a and 1b show a bottom scanning image system according to aspects of the present invention.

The invention is directed to image scanning systems and, more particularly, to optical scanning systems which scan images of objects as they are transported along a conveying system and methods of such scanning. In embodiments, the image scanning system includes an optical system comprising a combination of a mirror and camera oriented such that the scan line can be tilted above and/or below the optimal focus points, while still acquiring an acceptably focused image. This allows the image scanning system (e.g., camera and/or mirror) to be moved away from the conveying system and, more particularly, away from directly beneath or above the conveyor system.

As one of skill in the art would understand, the projected scan line typically has to be parallel to the surface being scanned so that every pixel on the sensor is at the optimal focus and of uniform scale. Any tilting off the surface being scanned will cause the spatial resolution to change as a gradient from smaller (pixels that are further from the surface) to larger (pixels that are closer to the surface). In a tilted configuration, with the center pixel in perfect focus, the further the pixel is from this "optimal focus pixel", the more the focus will degrade.

However, implementations of the present invention use cameras with large depths of focus which no longer have to be constrained in the above manner and, in accordance with aspects of the invention, can now be positioned such that the scan lines can be tilted as described herein. That is, in embodiments, the ends of the scan line can be tilted off the focal plane. In combination with using distortion correction algorithms, it is possible to correct for resolution variations that may result from the titled scan lines. For example, dynamic rescaling of images, as is known to those of skill in the art, can be used to correct for gradient compression distortion. The distortion correction for a dynamic focusing application would also correct for any trapezoidal perspective effect.

Thus, given the improvements in sensor sensitivity, e.g., the depth of focus of camera systems can be increased by using tighter apertures, the scan line can be tilted above and/or below the optimal focus points, and still acquire an acceptably focused image. This orientation, in embodiments, can remove the camera and mirror configuration from below the conveyor system. More specifically, in embodiments, the mirror and camera system can be positioned above, below or on a side of the object to be scanned, and the scan line can be tilted (e.g., further from the optimal focus points) while still acquiring an acceptably focused image. In embodiments, any distortion that may result from the positioning of the image scanning system is similar to the perspective distortion that currently exists and which can be corrected for with rescaling operations known to those of skill in the art.

Advantageously, for bottom scanned imaging applications, the placement of the mirror and camera system allows the camera and/or mirrors to reside in a much cleaner environment, reducing maintenance, e.g., cleaning. The placement of the mirror and camera system will also eliminate the need for additional, costly equipment to filter the debris from the air below the conveyor system. Also, this allows a narrower gap so that smaller objects will not fall within the gaps or jump when crossing the gap thus enabling improved image capture, e.g., a more stable image. In top scan applications, the positioning of the mirror and camera system will allow shorter conveying systems and the placement is better suited for maintenance without having to stop the conveying system or provide means of safe access while the belts or other conveyances are running.

Figure 1B:
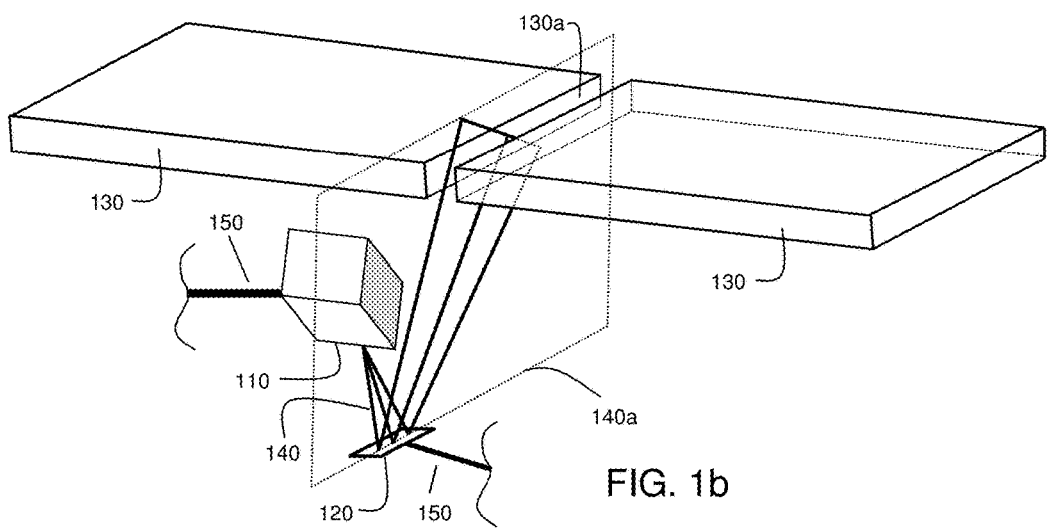

FIGS. 1a and 1b show a bottom scanning image system according to aspects of the present invention. In particular, the bottom scanning image system 100 includes a camera 110 and a mirror 120 positioned such that the projected scan line 140 is provided at an angle "x" with respect to a conveying system 130, e.g., scan line titled at about 20° in one embodiment. In embodiments, the projected scan line 140 can be titled at other angles "x" such as, e.g., +/−45° as a non-limiting illustrative example, relative to a plane of an imaged surface. Accordingly, in embodiments, the ends of the scan line can be tilted off the focal plane. In embodiments, the scanning plane 140a is also perpendicular to the conveyor surface 130.

In further embodiments of the bottom scanning application, the tilting of the scan line allows the camera 110 and the mirror 120 to be positioned on a side of the conveyor system 130 to minimize any debris falling on the optical components. That is, the camera 110 and the mirror 120 can be positioned away from a gap or space 130a formed between belts of the conveying system 130. It should also be understood that multiple cameras and mirrors can be positioned on different sides of the conveyor system 130 as represented in dashed lines of FIG. 1a.

In addition, in bottom side applications, the positioning of the scanning image system, e.g., camera 110 and mirror 120, will allow more light to be driven through a gap or spacing 130a between adjacent belts of the conveying system 130 making the camera 110 easier to align. In this way, the projected scan line 140 can project through a narrower gap or spacing 130a (see, e.g., FIG. 1b) between adjacent belts or other conveyances of the conveying system 130 (compared to conventional systems). For example, the gap or spacing 130a can be less than an inch; although, this spacing can be dependent on the type of conveyances used, e.g., knife edge belts vs. large diameter rollers.

Also, by having the camera 110 and the mirror 120 offset from the conveying system 130, the cameras and other optics are much more accessible for setup and maintenance, compared to being positioned directly below the conveying system 130. Moreover, glare can be considerably reduced as a direct result of the tilted view, e.g., the "glare reduction angle" is maintained from the side.

Figure 2:
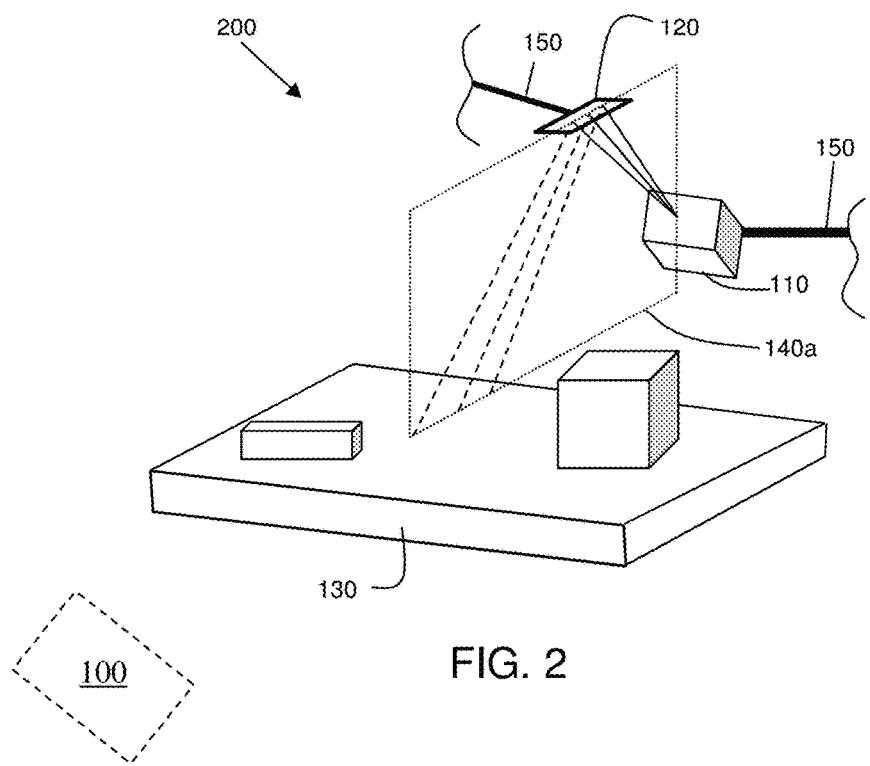
FIG. 2 shows a top scanning image system according to aspects of the present invention.

FIG. 2 shows a top scanning image system according to aspects of the present invention. In embodiments, the top scanning image system 200 can be combined with the bottom scanning image system 100 shown in FIGS. 1a and 1b, as represented in dashed lines of FIG. 2.

The image system 200 includes a camera 110 and a mirror 120 positioned to the side of the conveying system 130, rather than directly over the conveying system. In additional or alternative embodiments, the mirror 120 can be positioned above the conveying system 130. In embodiments, the scan line can be provided at an angle "x", e.g., scan line tilted at about 20°; although other angles "x" are also contemplated by the invention as already described herein. In embodiments, the scanning plane 140a is also perpendicular to the conveyor surface 130.

The ability to have the scanning plane perpendicular to the conveyor surface creates additional opportunities. For example, in top side scanning applications, less conveyance length is required to scan taller vs. shorter items (compared to conventional systems). That is, in the configuration shown in FIG. 2, for example, because the glare angle is accomplished by the side angle tilt, it allows the scan line plane to be perpendicular to the surface, which minimizes the necessary conveyor length. With this flexibility, the cameras and mirrors can also be placed at the side of the conveyor, where they are easier to access. In addition, the mounting structures, representatively shown at reference numeral 150, can be less complicated, since they do not have to span over the conveyor system 130.

Figure 3:
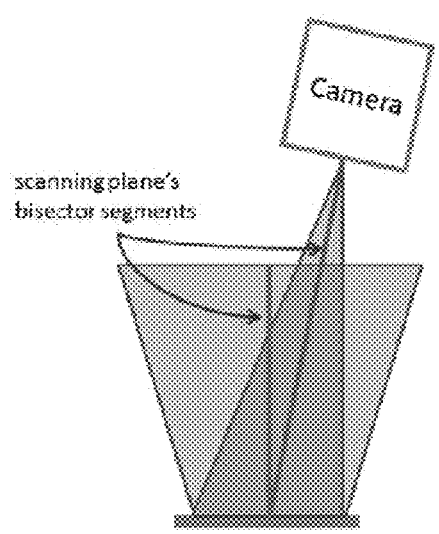
FIG. 3 shows a schematic view of a placement of camera and mirror and viewing angles thereof.

As representatively shown in FIG. 3, if a "folding mirror" is used to redirect the scanning plane, the triangular scanning plane's bisector segments would typically have to form a plane that remains orthogonal to the scanning plane. While this is not required, it simplifies aligning the scan line with the surface being imaged. If the scan line is allowed to tilt off of the plane, of the surface being imaged, then the orientation and location of the mirror is much more flexible.

Figure 4:
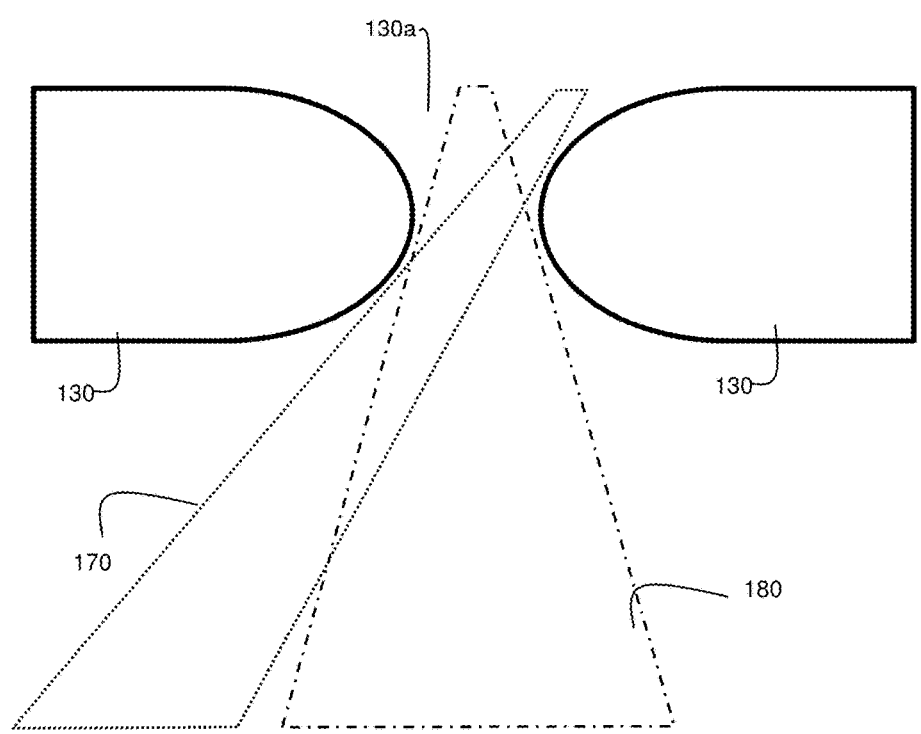
FIG. 4 shows a side view of a gap between conveyance systems in accordance with aspects of the invention.

FIG. 4 shows a side view of a gap 130a between conveyance systems 130 in accordance with aspects of the invention. FIG. 4 shows a conventional glare angle 170 and a glare angle 180 enabled by aspects of the present invention. As shown in FIG. 4, the glare angle 180 allows more light into the available gap 130a. As the present invention enables light to be illuminated from the side of the conveying system, it is now possible to take advantage of the full available width of the gap 130a, compared to being underneath the conveying system which does not provide the same advantages.

Figure 5A:
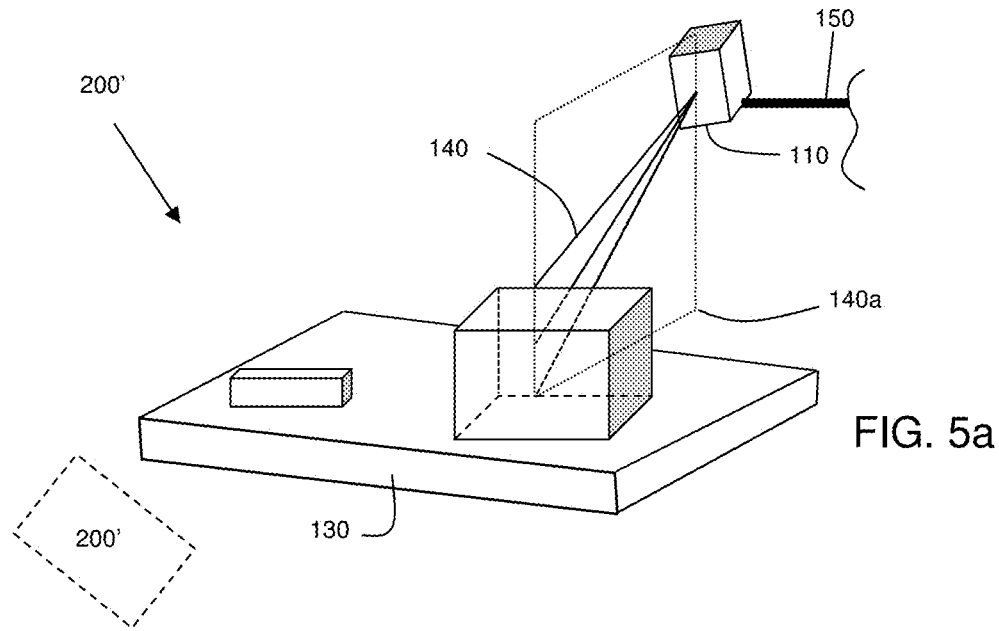
FIG. 5a shows an implementation of a side scanning image system in accordance with aspects of the invention.

FIG. 5a shows an implementation of a side scanning image system according to aspects of the present invention. In particular, in this implementation, the side scanning image system 200' includes a camera 110 positioned to the side of the conveying system 130, with a tilted scan line 140. In embodiments, the scanning plane 140a may be perpendicular to the conveyor surface 130. In this embodiment, as well as other embodiments implementing aspects of the present invention, the mirror can be eliminated thus significantly decreasing system costs and maintenance. In further embodiments, by implementing aspects of the present invention it is possible to image a top and sides of the object with a single camera.

Figure 5B:
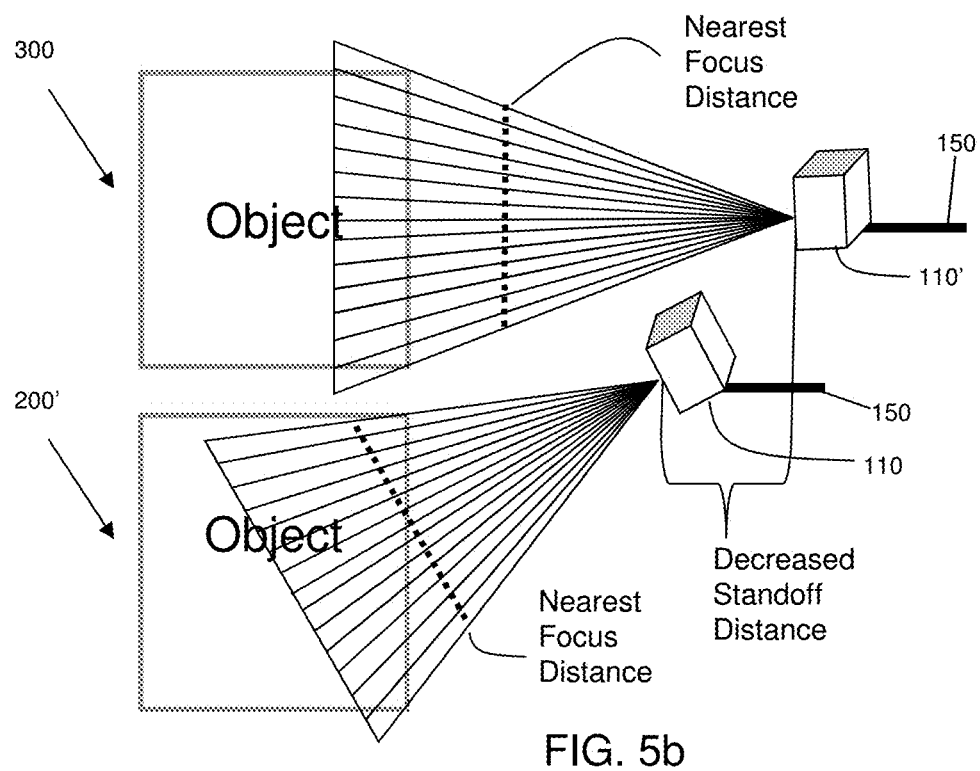
FIG. 5b shows a comparison of a conventional side scanning image system and a side scanning image system in accordance with aspects of the invention.

FIG. 5b shows a comparison of a conventional side scanning image system 300, without a mirror, and the side scanning image system 200' in accordance with aspects of the invention, without a mirror. As shown in this comparison, the conventional system 300 includes a camera 110' which is positioned farther away from the object being scanned than that of the side scanning image system 200' of the present invention. In a non-tilted scan line implementation without the use of a mirror, as shown in the conventional system 300, this is needed in order to provide a larger scan projection (e.g., standoff distance) to capture the entire object. In comparison, though, by providing a side scanning image system 200', a shorter standoff distance is required for full object coverage. Accordingly, by implementing the side scanning image system 200', there is no longer a need to include a mirror, which would otherwise be required for folding the scan projection for a conventional system, so as to minimize it's interference with surrounding equipment and aisle ways.

In this way, the side scanning image system 200' of the present invention can be as compact as a conventional system which uses a folding mirror. In addition, limited space or, alternatively, costly space, in many facilities would have to be used, as a conventional system 300, without a folding mirror, would require the camera 110 to be in an aisle or even require an increased ceiling height.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. An optical system, comprising:
   a conveying system;
   optical elements including a camera and a mirror positioned below and to a side of the conveying system and an object path through the conveying system such that a scan line is tilted with respect to an imaging surface of conveyed objects; and
   a distortion corrector configured to correct distortion resulting from the tilted scan line, and to use dynamic resealing to correct gradient compression distortion,
   wherein a portion of the scan line is tilted off of a focal plane.

2. The optical system of claim 1, wherein the scan line is tilted such that ends of the scan line are further from optimal focus points.

3. The optical system of claim 1, wherein the camera and the mirror are positioned to the side of the conveying system for bottom scanning applications.

4. The optical system of claim 1, wherein the camera and the mirror are positioned to a side of a gap or space formed between conveyances of the conveying system.

5. The optical system of claim 1, wherein the tilted scan line is approximately +/−45° relative to a plane of an imaged surface.

6. The optical system of claim 1, wherein a scanning plane of the optical elements is perpendicular to a surface of the conveying system.

7. The optical system of claim 1, wherein the distortion resulting from the tilted scan line that is corrected by the distortion corrector comprises resolution variations.

8. The optical system of claim 1, wherein the distortion corrector is configured to correct trapezoidal perspective effect.

9. An optical system, comprising:
   a conveying system comprising multiple conveyances with gaps between adjacent conveyances of the multiple conveyances;
   at least a camera and a mirror which project a scan line through one of the gaps such that the scan line is tilted with respect to an imaged surface of conveyed objects; and
   a distortion corrector configured to correct distortion resulting from the tilted scan line,
   wherein:
     the camera and the mirror are positioned below and to a side of the conveying system and an object path through the conveying system,
     a portion of the scan line is further from optimal focus points for the conveying system,
     the distortion resulting from the tilted scan line that is corrected by the distortion corrector comprises resolution variations, and
     the distortion corrector is configured to use dynamic resealing to correct gradient compression distortion.

10. The optical system of claim 9, wherein ends of the tilted scan line are further from the optimal focus points for the conveying system.

11. The optical system of claim 9, wherein at least the camera is positioned below and to a side of the conveying system for bottom scanning applications.

12. The optical system of claim 9, wherein at least the camera is positioned to a side of conveyances of the conveying system.

13. The optical system of claim 9, wherein the mirror is positioned relative to the camera in order to fold a projected scan plane and project the scan line to an imaged surface of the conveyed objects.

14. The optical system of claim 9, wherein a scanning plane of the camera is perpendicular to a surface of the conveying system.

15. The optical system of claim 9, wherein ends of the scan line are tilted off the focal plane.

16. A method of scanning objects on a conveying system, comprising:
   projecting, from a camera and a mirror that are above and to a side of the conveying system and an object path through the conveying system or below and to the side of the conveying system and the object path through the conveying system, a scan line at a tilted angle at the object while the object is being transported along the conveying system, wherein a portion of the scan line is tilted off of a focal plane; and
   correcting distortion resulting from the tilted scan line by using dynamic resealing to correct gradient compression distortion and by correcting trapezoidal perspective effect.

17. The method of claim 16, wherein the projecting of the scan line provides a focal plane perpendicular to a surface of the conveying system.

* * * * *

UNITED STATES PATENT AND TRADEMARK OFFICE
CERTIFICATE OF CORRECTION

PATENT NO. : 10,244,149 B2
APPLICATION NO. : 14/734639
DATED : March 26, 2019
INVENTOR(S) : Michael Riess Page 1 of 1

It is certified that error appears in the above-identified patent and that said Letters Patent is hereby corrected as shown below:

In the Claims

Column 5, Line 52: in Claim 1, --resealing-- should be changed to --rescaling--.

Column 6, Line 29: in Claim 9, --resealing-- should be changed to ---rescaling--.

Column 6, Line 59: in Claim 16, --resealing-- should be changed to --rescaling--.

Signed and Sealed this
Eighteenth Day of June, 2019

Andrei Iancu
*Director of the United States Patent and Trademark Office*